United States Patent

Suzuki

[15] 3,701,861

[45] Oct. 31, 1972

[54] MAGNETIC HEAD USING THE HALL EFFECT FOR REVERBERATION

[72] Inventor: Tsutomu Suzuki, Yokohama, Japan

[73] Assignee: Pioneer Electronic Corporation, Tokyo, Japan

[22] Filed: Nov. 13, 1970

[21] Appl. No.: 89,431

[30] Foreign Application Priority Data

Nov. 15, 1969 Japan ......................44/91105

[52] U.S. Cl. ................179/100.2 CH, 179/100.2 RE

[51] Int. Cl. .........G11b 5/22, G11b 5/28, G11b 5/38

[58] Field of Search..............179/100.2 CH, 100.2 C; 340/174.1 F; 346/74 MC

[56] References Cited

UNITED STATES PATENTS

| | | | |
|---|---|---|---|
| 2,866,013 | 12/1958 | Reis | 179/100.2 CH |
| 3,209,078 | 9/1965 | Neumann | 179/100.2 CH |
| 3,146,317 | 8/1964 | Kuhrt et al. | 179/100.2 CH |
| 3,443,036 | 5/1969 | Maass | 179/100.2 CH |
| 3,114,009 | 12/1963 | Camras et al. | 179/100.2 CH |

*Primary Examiner*—Terrell W. Fears
*Assistant Examiner*—Alfred H. Eddleman
*Attorney*—Sughrue, Rothwell, Mion, Zinn & Macpeak

[57] ABSTRACT

A first and second magneto-electric converting films, comprising for example, Hall elements, are vapor deposited onto a first and second highly permeable magnetic substances independently of each other. The resulting configuration is aligned so as to correspond with each track of a magnetic tape. A desired number of the magneto-electric converting films can be positioned parallel with each other. The resulting magnetic head with the multiple magneto-electric converting films is capable of producing a sustained reverberation or echo.

6 Claims, 2 Drawing Figures

INVENTOR
TSUTOMU SUZUKI
BY Sughrue, Rothwell, Mion, Zinn & Macpeak
ATTORNEYS

MAGNETIC HEAD USING THE HALL EFFECT FOR REVERBERATION

BACKGROUND OF THE INVENTION

1. Field of the Invention

This invention relates generally to a magnetic head for use with magnetic reproducing equipment, and more particularly to a magneto head wherein a plurality of magnetic-electric converting means are formed by vapor evaporation and arranged in parallel with each other.

2. Description of the Prior Art

Previous attempts to produce a sustained reverberation effect in reproducing sound has required a plurality of magnetic heads to be aligned in parallel with each other. It was thus necessary to provide enough space to set a plurality of magnetic reproducing heads in the magnetic reproducing equipment. Generally a compact tape magnetic reproducing assembly, for example, of the cartridge type, could not be provided with this multiplicity of heads because of the space limitation.

SUMMARY OF THE INVENTION

The present invention provides a novel and improved magnetic reproducing head in which a plurality of magneto-electric converting means are formed by vapor evaporation. The resulting configuration of magneto-electric converting means is generally aligned in parallel. With the present invention, it is possible to reproduce from a recorded magnetic tape a sustained reverberation or echo. Other objects of this invention will be obvious from the contents of the specification hereinafter disclosed.

BRIEF DESCRIPTION OF THE DRAWINGS

The invention will be better understood from the following description taken in conjunction with the accompanying drawings, in which.

DESCRIPTION OF THE PREFERRED EMBODIMENT

Figure 1:
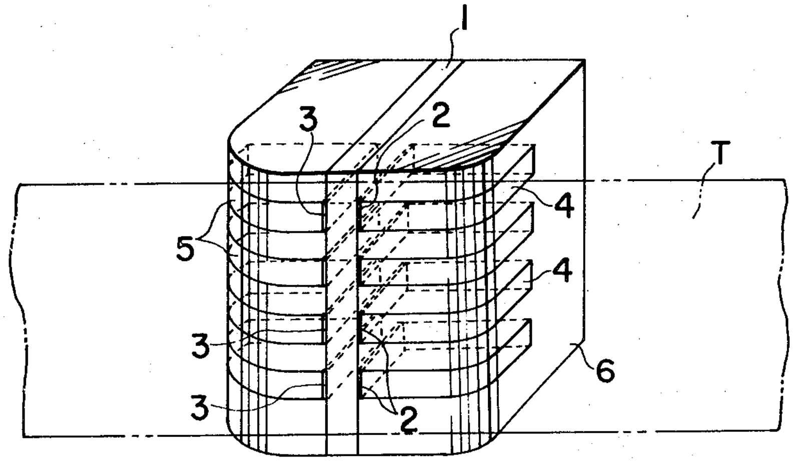
FIG. 1 is a perspective view of one embodiment of a magnetic head according to this invention.

Referring to FIG. 1, a magnetic head for use with a four track tape is disclosed. Basically, the magnetic head comprises a first highly permeable magnetic substance referred to as reference 1 and extending transversely across the path of the tape or in an elevated position according to FIG. 1. This first highly permeable magnetic substance 1 can be made of ferrite. Four magneto-electric converting films 2, for example Hall elements, are adhered onto the front part of the right side of the first highly permeable magnetic substance 1, and in addition four other magneto-electric converting films 3 are adhered onto the front part of the left side of the first highly permeable magnetic substance 1. Second highly permeable magnetic substances 4 and 5, which also are composed of ferrite, are positioned respectively to the opposite side of each magneto-electric converting films 2 and 3 so as to constitute, respectively, a magnetic circuit corresponding with each track of a magnetic tape. The magnetic substances 1, 4 and 5 are secured by a holding member 6 which is made of a non-permeable substance, for example, glass, ceramic or other non-magnetic material. The magneto-electric converting films 2 and 3 are generally adhered onto the first or second highly permeable magnetic substance 1 or 4 and 5 by means of vapor depositing. The remaining magnetic substance is then closely deposited so as to hold the magneto-electric converting films 2 and 3 in each magnetic circuit.

Figure 2:
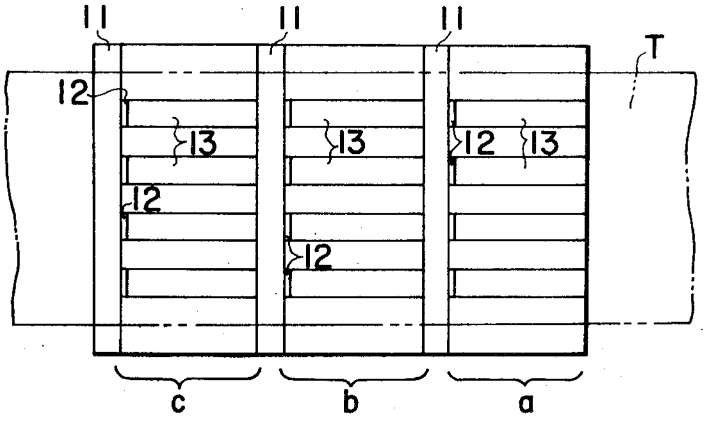
FIG. 2 is a schematic front elevational view of another embodiment of a magnetic head according to this invention.

Referring to FIG. 2, a magnetic head for four tracks is disclosed. A first highly permeable magnetic substance 11 is adhered to magneto-electric converting films on its one surface. As in FIG. 1, the first highly permeable magnetic substance 11 is traversely or elevationally positioned on the magnetic head. Four magneto-electric converting films 12, for example Hall elements, are adhered onto the front part of the right side of the first highly permeable magnetic substance 11. The second highly permeable magnetic substances 13 are independently positioned to the opposite side of each magneto-electric converting films 12. As can be seen from FIG. 2, the magnetic head can be broken up into three components, *a*, *b* and *c*. Each individual component is constructed in accordance with the above disclosure and adhered one after another to the left side of another component so as to correspond with each track of a magnetic tape T.

It is obvious that the number of magneto-electric converting films can be increased or decreased in accordance with the number of tracks on a magnetic tape. The number of the components can also be increased or decreased according to the required value of a sustained reverberation sought.

Thus, according to the present invention a sustained reverberation effect or echo effect can be obtained with only one magnetic head which does not require a wide space along the tape running direction. Magneto-electric converting films of one component can be formed together by means of vapor depositing on the same surface of the highly permeable magnetic substance. By following the above disclosure, a magnetic head of the present invention can be constructed in a simple and easy process.

What is claimed is:

1. A magnetic head for use with a magnetic tape having a plurality of tracks comprising: a highly permeable magnetic substance, first and second pluralities of magneto-electric converting films each plurality corresponding in number to the number of tracks on said magnetic tape, and adhering respectively to opposite surfaces of said highly permeable magnetic substance, the films of each plurality being positioned so as to be in alignment with the tracks on the magnetic tape and a plurality of highly permeable magnetic elements, each element being associated with a corresponding film, an element being deposited on the side of each magneto-electric converting film opposite the side adhering to the highly permeable magnetic substance.

2. A magnetic head for use with a magnetic tape having a plurality of tracks comprising: a highly permeable magnetic substance, a plurality of magneto-electric converting films equal in number to the number of tracks on said magnetic tape adhering to one surface of said highly permeable magnetic substance, the films being positioned so as to be in alignment with the tape tracks, a plurality of highly permeable magnetic elements equal in number to the number of films, an element being deposited on the side of each film opposite the side adhering to the highly permeable magnetic substance; the highly permeable magnetic substance and the plurality of films and elements forming one component and an additional highly permeable magnetic substance directly adjacent said plurality of elements, another plurality of magneto-electric converting films equal in number to the number of tape tracks and adhering to one surface of the additional highly permeable magnetic substance, the additional films being positioned so as to be in alignment with the tape tracks, and an additional plurality of highly permeable magnetic elements equal in number to the number of additional films, an additional element being deposited on the side of each additional film opposite the side adhering to the additional highly permeable magnetic substance to form another component whereby there is formed a sequential array of components.

3. A magnetic head as set forth in claim 1, further comprising a holding member whereby the highly permeable magnetic substance and said plurality of elements are secured together.

4. A magnetic head as set forth in claim 2, further comprising a holding member whereby the highly permeable magnetic substance and said plurality of elements are secured together.

5. A magnetic head as set forth in claim 1, wherein the magneto-electric converting films are Hall elements.

6. A magnetic head as set forth in claim 2, wherein the magneto-electric converting films are Hall elements.

* * * * *